US006211634B1

(12) United States Patent
Heller et al.

(10) Patent No.: US 6,211,634 B1
(45) Date of Patent: Apr. 3, 2001

(54) METHOD AND APPARATUS FOR INITIALIZATION AND OPERATION OF FIELD-COMMUTATED MOTORS AND MACHINES INCORPORATING FIELD-COMMUTATED MOTORS

(75) Inventors: Marcus C. Heller; Michael Mann; Christoph Ernecke, all of Berlin (DE)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 09/363,267

(22) Filed: Jul. 29, 1999

(51) Int. Cl.[7] ........................................................ H02P 1/18
(52) U.S. Cl. ........................................... 318/254; 318/138
(58) Field of Search ..................................... 318/138, 254, 318/439, 798, 799, 805, 809

(56) References Cited

U.S. PATENT DOCUMENTS

| 4,561,093 | 12/1985 | Doane et al. | 371/20 |
|---|---|---|---|
| 5,008,608 | * 4/1991 | Unsworth et al. | 318/729 |
| 5,274,317 | * 12/1993 | Utley et al. | 318/802 |
| 5,635,810 | * 6/1997 | Goel | 318/719 |
| 5,838,122 | 11/1998 | Vu | 318/254 |
| 5,883,344 | 3/1999 | Colby et al. | 187/393 |
| 6,051,946 | * 4/2000 | Yamada et al. | 318/432 |
| 6,111,385 | * 8/2000 | Nozaki et al. | 318/696 |

FOREIGN PATENT DOCUMENTS 0 490 024 A1    6/1991   (EP) .

OTHER PUBLICATIONS

M. Stiebler, Y. Li, ETEP, Vol.9.No., Jan./Feb. 1999, pp. 43 through 47, "Detection of the Rotor Position of a Permanent–Magnet Synchronous Motor at Standstill".

Peter B. Schmidt, et al., IEEE Industry Applications Society, Rockwell Automation, Pub. Date May 10, 1997, pp. 459 thru 463 "Initial Rotor Angle Detection of a Non–Silent Pole Permanent Magnet Synchronous Machine".

* cited by examiner

Primary Examiner—Robert E. Nappi
Assistant Examiner—Rina I. Duda

(57) ABSTRACT

Methods and apparatus are disclosed for calibrating a field-commutated motor (10) when under load, wherein initializing the motor (10) refers to relating data representative of the angle of the rotor in an uncalibrated coordinate system to a coordinate system having a known relationship to the excitation coils (17), typically mounted with the stator (16). The angular data can then be used for exciting the excitation coils (17) in the proper sequence and with the proper timing to obtain the desired speed, torque, direction or rotation, etc. of the motor (10). Test voltages having a known orientation are applied to one of the stator and the rotor, (whichever mounts the excitation coils (17)), and the angle of the rotor produced by the application of each of the test voltages noted. An equation is disclosed for determining an error angle between the uncalibrated and the known coordinate system as a function of the angles of the rotor produced by application of the test voltages. Apparatus for practicing the invention can include a processor (26), a power supply (12), and user input element (35) and a voltage and/or current sensor (35). The processor (26) can include appropriate means for executing the disclosed method steps.

12 Claims, 3 Drawing Sheets

US 6,211,634 B1

METHOD AND APPARATUS FOR INITIALIZATION AND OPERATION OF FIELD-COMMUTATED MOTORS AND MACHINES INCORPORATING FIELD-COMMUTATED MOTORS

FIELD OF THE INVENTION

This invention relates to field-commutated motors and machines incorporating such motors.

BACKGROUND OF THE INVENTION

FIG. 1 shows a simple schematic of a field-commutated motor 10 powered by a power supply 12, and having a stator 16 and a rotor 20. The stator mounts excitation coils 17 (A–A', B–B', C–C' and D–D'), which are sequentially excited such that the coils act as magnets, having north and south poles, to generate forces on the permanent magnets 21 mounted on the rotor 20, thereby rotating the rotor 20. A knowledge of the position of the rotor magnets 21 relative to the coils 17 is necessary for the coils to be excited in the proper sequence and with the proper timing to provide the desired torque, speed or direction of rotation of the rotor 20. Typically, a sensor 22 provides raw data representative of the rotor angular position in a "sensor", or uncalibrated, coordinate system. However, this data must be used to determine the position of the magnets 21 relative to the coils 17. Initialization of the motor, as used herein, refers to determining the relationship between the uncalibrated coordinate system and a coordinate system having a known relationship to the excitation coils 17, such that the relationship of the magnets 21 to the coils can be determined from the raw, or uncalibrated, angular data. The raw data is initialized and the initialized data is used in sequencing and timing the excitation of the coils 17.

Initialization of the motor 10 can be rather straightforward if the motor 10 is accessible and not under load. Excitation of the stator 16 with a test voltage of a known orientation produces a known angular position of the rotor 20, because the load angle is zero. The raw data from the sensor 22, giving an angle in the uncalibrated coordinate system, can be related to a q-d rotor coordinate system, where d is the axis of the magnets 21 and q is the quadrature axis, such that the "error angle" between the uncalibrated and rotor coordinate system is determined. As the relationship between the q-d rotor coordinate system and the excitation coils 17 is known, the error angle is then used during operation of the motor to properly excite the coils 17 to obtain the desired performance of the motor 10. Accordingly, initialization is not necessarily a difficult problem at the motor factory.

However, initialization as above requires that motors shipped from the factory include the sensor 22 and be subsequently carefully handled such that the physical relationship between the sensor 22 and rotor 20 is not disturbed. Such motors are often installed in complex machinery, such as elevators, at the site where the machinery is to be installed. Installation provides yet another opportunity for the initialization to be disturbed. Initialization, or re initialization, of an installed motor is tedious. The motor 10 is typically under load, and the load (e.g., the elevator) must be manually manipulated, such as by adjusting cables, to remove the load to allow the initialization procedure outlined above to be followed. Such manipulation can be time consuming and require additional personnel. Replacement in the field of a failed sensor 22 similarly requires removal of the load or installation of a new initialized motor including a new sensor 22. A simpler and more efficient initialization procedure would represent a useful advance in the art.

Accordingly, it is an object of the present invention to address one or more of the aforementioned deficiencies and disadvantages of the prior art.

Other objects will in part appear hereinafter and in part be apparent to one of ordinary skill in light of the disclosure herein.

SUMMARY OF THE INVENTION

The present invention addresses the above object by providing methods and apparatus for calibrating a field-commutated motor when the motor is under non-zero load. Accordingly, zeroing of the load on the motor can be avoided, saving time and effort otherwise expended in commissioning apparatus incorporating the motor therein, such as an elevator.

A method according to one aspect of the invention includes the steps of: applying a first voltage of a first orientation and of a first magnitude to one of the rotor and the stator; determining a first rotor angle corresponding to application of the first voltage; applying a second voltage to the one of the rotor and the stator, the second voltage having an orientation substantially equal to the first orientation and a second magnitude different from the first magnitude, the second voltage being applied when the motor is under a load substantially equal to the load applied during the application of the first voltage; determining a second rotor angle corresponding to the application of the second voltage; and determining an error angle, as a function of at least the first and second rotor angles, for allowing calibration of the motor. The first and second voltages, or one or both of the respective currents that respectively correspond thereto, are used in the determination of the error angle. As is understood by one of ordinary skill, in light of the disclosure herein, the stationary currents and voltages are related by the resistance of the stator.

In another aspect of the invention, apparatus is disclosed for initializing and operating a field-commutated motor in accordance with the methods disclosed herein. The apparatus can include a processor, a sensor for determining rotor angular position, and a power supply. The processor is in electrical communication with the sensor and power supply, and includes provision, such as a hardware configuration or appropriate programming with software, for performing the above initialization and operating the motor. Processor, as used herein, can refer to specialized processor for initializing motors to determine the error angle, or to a more general processor, that in addition to calibrating the motor, operates the motor for use of the apparatus in which the motor is installed.

These and other features of the invention are more fully set forth below.

BRIEF DESCRIPTION OF THE DRAWINGS

For a more complete understanding of the invention, reference is made to the following Detailed Description of the Preferred Embodiments and the accompanying drawings, in which.

DETAILED DESCRIPTION OF THE PREFERRED EMBODIMENTS

Figure 1:
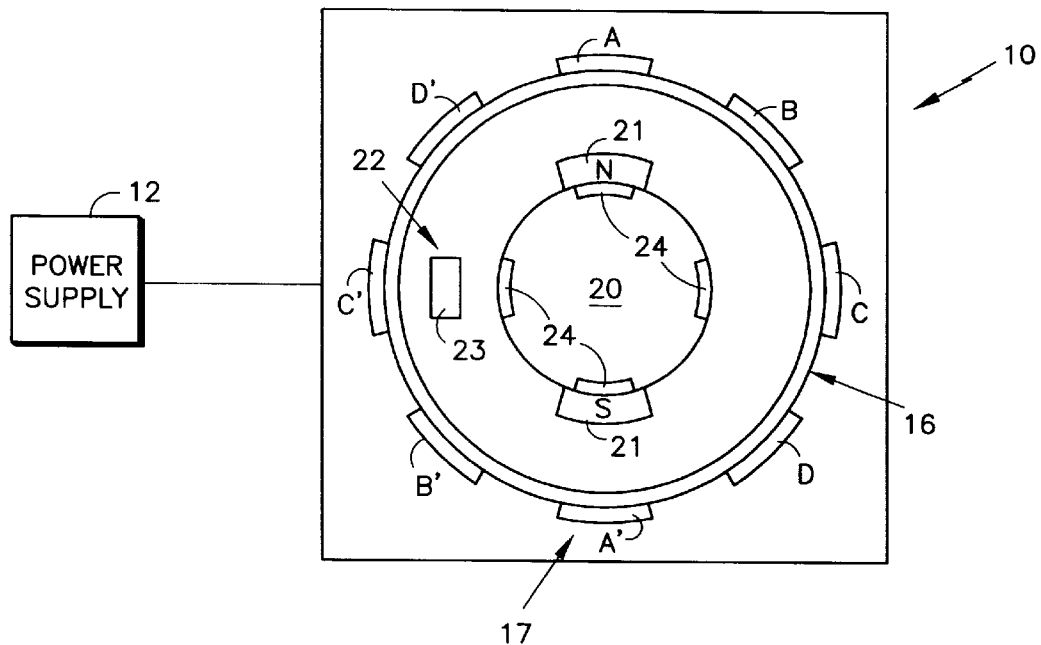
FIG. 1 is a schematic representation of a field-commutated motor and a power supply for providing power to the motor.
Figure 2:
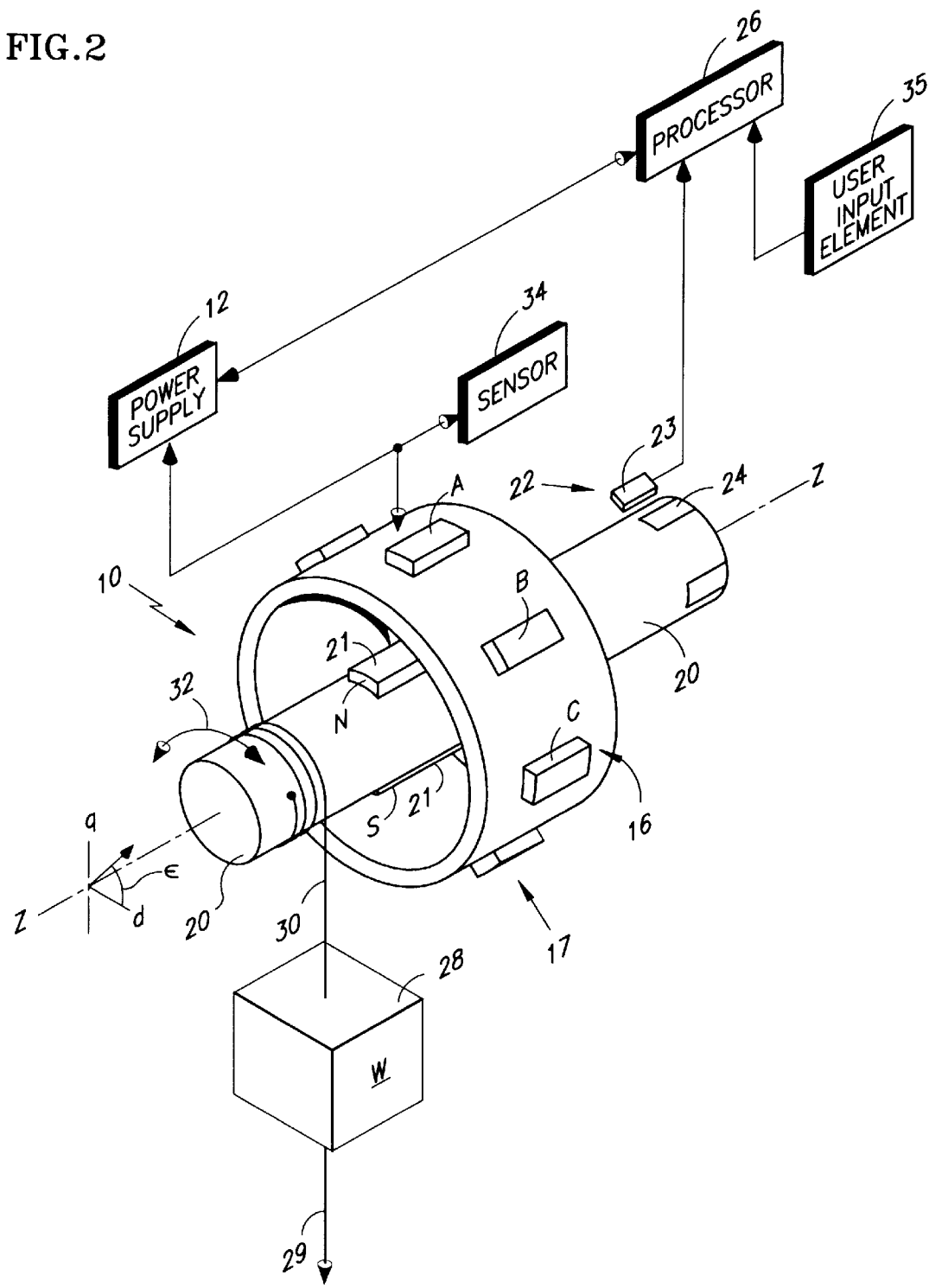
FIG. 2 is a schematic representation of apparatus for initializing the motor of FIG. 1, and includes a perspective view of the motor of FIG. 1.

FIGS. 1 and 2 illustrate a field-commutated motor 10. FIG. 1 is a view of the motor 10 taken along the Z—Z axis of FIG. 2, which illustrates the motor 10 in perspective. The field-commutated motor 10 includes a stator 16, mounting coils 17, indicated as A–A', B–B', C–C' and D–D', and a rotor 20 mounting permanent magnets 21. The power supply 12 provides power for exciting the coils 17 in a proper sequence and with the proper timing to rotate the rotor 20 about the Z axis, as indicated by the arrow 32, and in a desired direction and with a desired speed or torque. The sensor 22, which can include a fixed element 23 cooperating with indicia 24 mounted with the rotor 20, provides information regarding the angular position of the rotor 20 such that coils 17 can be excited in the proper sequence and with the proper timing. One sensor known in the art or suitable for use as the sensor 22 is referred to as a sine-cosine encoder. The power supply 12 is typically a pulse-width-modulated (PWM) supply. It is desired to determine the angle $\xi$ of the rotor 20 in a stator coordinate system.

With reference to FIG. 2, a load on the motor 10 is schematically illustrated by the weight 28 that is attached to a cable 30 wrapped around the rotor 20. The downward force 29 provided by the weight 28 produces a torque on the rotor 20. The weight 28 can be representative of the load placed on the motor 10 when the motor is used with apparatus such as an elevator. A processor 26 is in electrical communication with the power supply 12, the sensor 22, and a sensor (or sensors) 34 that can be included for measuring the currents and/or voltages provided to the excitation coils 17. The processor 26 can include provision for controlling the power supply 12 responsive to data received from the sensor 22 for operating the motor 10 to provide the desired torque, speed, direction of rotation, number of revolutions, etc. A user input element 35 can also be provided for allowing a user to provide instructions to the processor 26 for operating the motor. Many types of suitable user input elements are known in the art. The user input element 35 can be, for example, a keypad, a modem, or a pointing and selecting device, such as a mouse. The invention can also include a user output element (not shown), such as a video display, in electrical communication with the processor 26, for facilitating use of the pointing and selecting device or otherwise communicating with a user.

Figure 3:
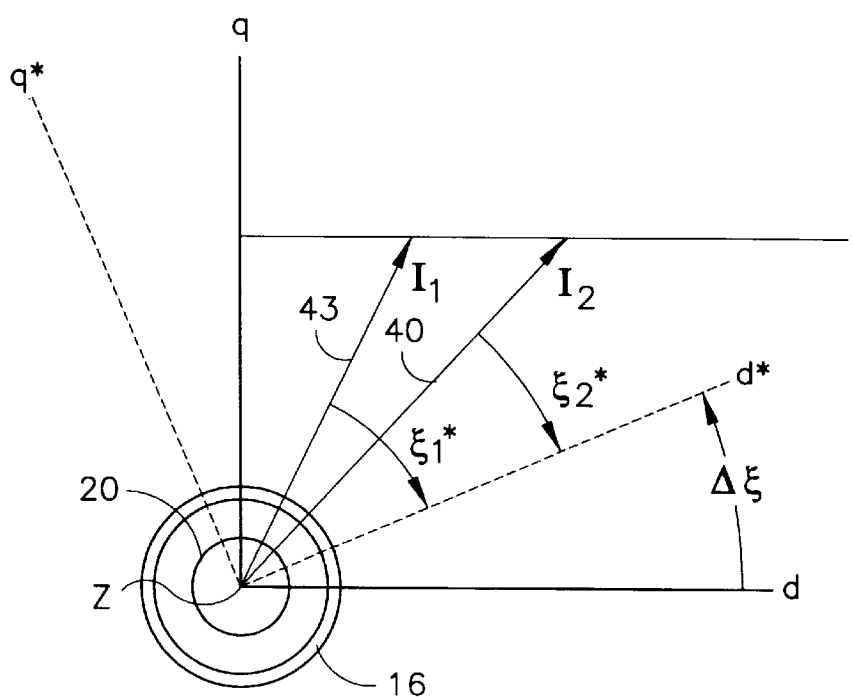
FIG. 3 illustrates an uncalibrated coordinate system and the q-d rotor coordinate system of the motor of FIGS. 1 and 2, the error angle relating the coordinate systems, and rotor angles produced by test voltages applied to the stator as part of an initialization procedure according to the present invention.

Initialization of the motor 10 according to the invention is now described with reference to FIGS. 3 and 4. FIG. 3 illustrates the rotor coordinate system having the axes q and d, and the uncalibrated coordinate system of the sensor 22, indicated by the axes q* and d*. The two coordinate systems are related by the error angle $\Delta\xi$, and a knowledge of $\Delta\xi$ is required to relate raw data from the sensor 22 to the rotor coordinate system q-d such that the position of the magnets 21 can be determined relative to the coils 17.

Figure 4:
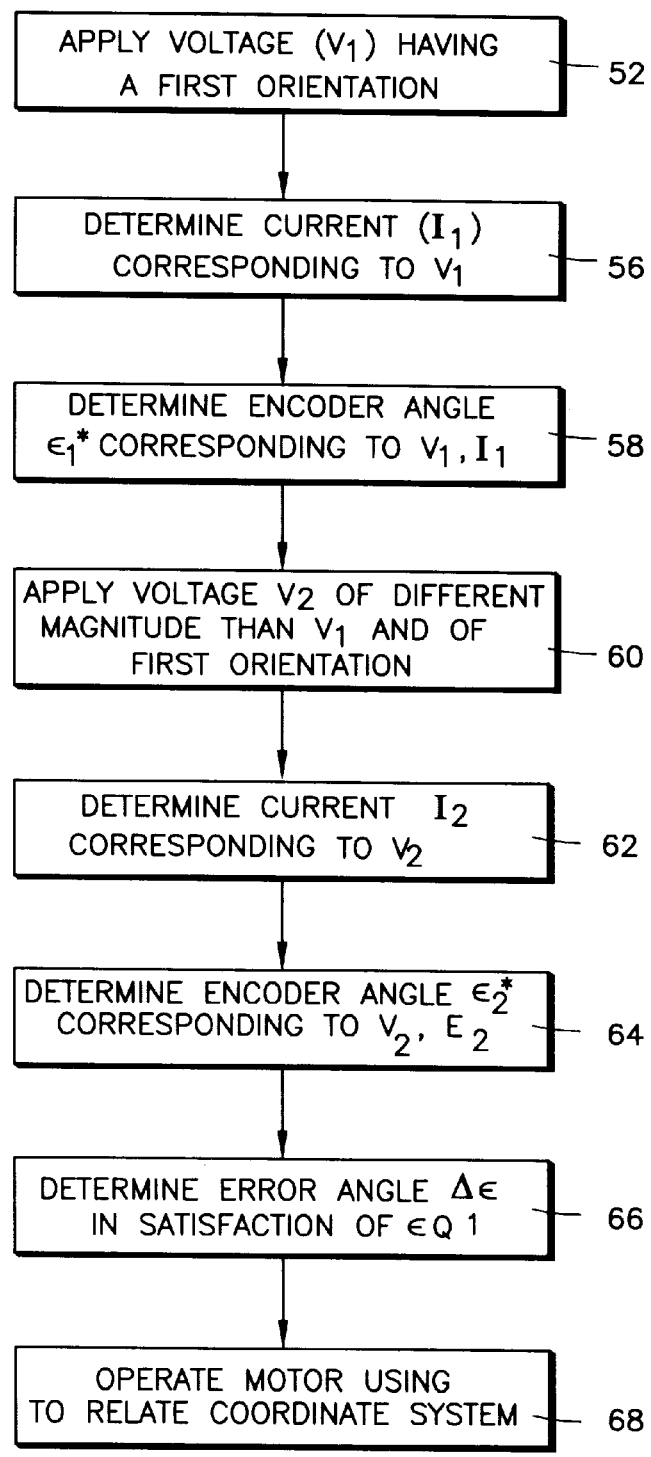
FIG. 4 is a flow chart illustrating the steps of an exemplary initialization procedure for initializing the motor to determine the error angle.

With reference to FIGS. 3 and 4, the error angle $\Delta\xi$ can be determined, even when the motor 10 is under a non-zero load, such as the load represented schematically by the weight 28, as follows:

As indicated by reference numeral 52 in FIG. 4, a voltage $V_1$, having a first orientation and first magnitude, is applied to the stator coils 17. Orientation of the voltage refers to orientation of the fields produced by current $I_1$ generated in at least one of the stator coils 17 by application of the voltage thereto. $V_1$ and $I_1$ are related by the resistance of the coil or coils to which the voltage is applied. The rotor rotates to the angle $\xi_1^*$ as indicated by reference numeral 43 in FIG. 3, where $\xi_1^*$ refers to the raw angle produced by the sensor 22 and representing the angle of the rotor 20 in the uncalibrated coordinate system. As indicated by reference numerals 56 and 58 in FIG. 4, the current $I_1$ and the angle $\xi_1^*$ are determined. The current and voltage can be determined by direct measurement, such as by voltage/current sensor 34 shown in FIG. 2, or the current can be determined from the voltage and a knowledge of the resistance of the appropriate coil or coils 17. The power supply 10 can provide a selected voltage or current responsive to user input or instructions from the processor 26, and hence the voltage or current can be determined from a knowledge of the instructions.

Next, as indicated by reference numeral 60 of FIG. 4, a second voltage, having a magnitude different from the magnitude of the voltage $V_1$ and of substantially the same orientation as the first voltage $V_1$, is applied to the stator coils. A second current $I_2$ corresponding to $V_2$ is produced, and the rotor rotates to a second angle $\xi_2^*$ as illustrated by reference numeral 40 in FIG. 3. As shown by reference numerals 62 and 64 in FIG. 4, $\xi_2^*$ and $I_2$ are next determined. Note that the magnitude of the load applied to the rotor 20 of the motor 10 during the determination of $\xi_2^*$ should be substantially the same as that applied during the determination of $\xi_1^*$ such that it can be assumed that the components of the vectors $I_1$ and $I_2$ shown in FIG. 3 along the q axis are equal.

Having determined $\xi_1^*$, $\xi_2^*$ and $I_1$ and $I_2$ (or alternatively $V_1$ and $V_2$ and the resistance of the appropriate coils 17), the error angle $\Delta\xi$ can be determined in accordance with the following formula (referred to herein as Equation 1):

$$\Delta\xi = \xi_2^* + \arcsin\{I_1[I_1^2 + I_2^2 - 2I_1I_2\cos(\xi_2^* - \xi_1^*)]^{-\frac{1}{2}} \sin(\xi_2^* - \xi_1^*)\}$$

where:

$\Delta\xi$=the error angle
$\xi_2^*$=the second rotor angle
$\xi_1^*$=the first rotor angle
$I_1$=the first current, which corresponds to the first voltage
$I_2$=the second current, which corresponds to the second voltage.

$I_1$ and $I_2$ are related to the corresponding voltages $V_1$ and $V_2$ by Ohm's law, where R is the resistance of the appropriate coil or coils, such that:

$V_1 = I_1/R$
$V_2 = I_2/R$

Once $\Delta\xi$ is determined, the initialized angle $\xi$ of the rotor 20, that is, the angle of the rotor in a rotor coordinate system, is determined according to:

$\xi = \xi^* - \Delta\xi$ where: $\xi^*$ is a third rotor angle in the uncalibrated coordinate system provided by the raw data from the sensor 22, and which typically represents the instantaneous position of the rotor during operation of motor 10; and $\Delta\xi$ is the error angle as determined above. The angle $\xi$ is used to properly sequence and time the excitation of the coils 17 (A–A', B–B', C–C' and D–D') mounted by the stator to provide the desired operation of the motor 10 or apparatus incorporating the motor 10. Note that the number of coils shown in FIG. 2 is merely exemplary.

As is understood by one of ordinary skill in the art, in light of the disclosure herein, the processor 26 can automatically conduct the above-described initialization, for example, according to instructions configured in processor hardware or programmed using software into a volatile or non-volatile memory of the processor 26. Such instructions can include the steps illustrated in FIG. 4 and direct the appropriate communication of the processor 26 with the sensor 22, the power supply 12, and, optionally the current and/or voltage sensor 34. The processor 26 can be a dedicated processor or can be a personal computer appropriately configured or programmed. Furthermore, although the processor 26 and power supply 12 are depicted in FIG. 2 as individual units, one of ordinary skill, in light of the disclosure herein, understands that the power supply 12 and processor 16 can be combined into a single unit. The processor can also operate the motor 10, or apparatus into which the motor 10 is incorporated, according to user input and/or additional instruction provided by software programming or hardware configuration. For example, if the motor 10 is incorporated into an elevator, the processor 26 can be a controller for the elevator, which responds as understood in the art to user input for conveying persons or freight between floors in a building.

If the sensor 22 provides only relative indications of angular displacement, the above initialization routine can be performed as necessary, for example, each time the processor 26 is powered up, or at appropriate times or appropriate intervals therebetween.

It is thus seen that the object set forth above, as well as those made apparent by the above disclosure, are officially attained. Because certain changes may be made in the above constructions without departing from the scope of the invention, it is intended that all matter contained in the above description and shown in the accompanying drawings be considered as illustrative and not in a limiting sense. For example, in the accompanying FIGURES the rotor 20 mounts the permanent magnets 21 and the stator 16 mounts coils 17. It is understood by those of ordinary skill, in light of the disclosure herein, that the stator 16 can mount the magnets and the rotor can mount the coils, and that the methods and apparatus of the present invention can also be useful with such a motor.

In addition, data regarding the angular position of the rotor need not be obtained via the use of a sensor 22 such as an encoder. It is known in the art to obtain such data via monitoring the back emf of coils associated with the motor 10. Such data may also be uncalibrated and require initializing the motor to relate the position of permanent magnets to excitation coils.

It is also understood that the following claims are intended to cover all generic and specific features of the invention described herein, and all statements of the scope of the invention which as a matter of language might be said to fall therebetween.

Having described the invention, what is claimed as new and secured by Letters Patent is:

1. A method of initializing a field-commutated motor when under load, the motor including provision for determining rotor angle, the method comprising the steps of:
    applying a first voltage of a first orientation and of a first magnitude to one of the rotor and the stator;
    determining a first rotor angle corresponding to application of the first voltage;
    applying a second voltage to one of the rotor and the stator, the second voltage having an orientation substantially equal to the first orientation and of second magnitude different from the first magnitude, the second voltage being applied when the motor is under a load substantially equal to the load applied during the application of the first voltage;
    determining a second rotor angle corresponding to the application of the second voltage; and
    determining an error angle as a function of at least the first and second rotor angles for allowing initialization of the motor.

2. The method of claim 1 wherein at least one of the step of determining the first rotor angle and the step of determining the second rotor angle includes determining a rotor angle from an encoder for sensing rotor angle.

3. The method of claim 1 wherein the steps of applying the first and second voltages include applying the first and second voltages to stator coils.

4. The method of claim 1 wherein the steps of applying the first and second voltages include applying the first and second voltages to rotor coils.

5. The method of claim 1 wherein the step of applying the second voltage includes the step of applying a second voltage having a magnitude that is less than the magnitude of the first voltage.

6. The method of claim 1 including the step of determining the magnitude of a one of a first current and a second current corresponding, respectively, to the first and second voltages, and wherein the step of determining the error angle includes determining the error angle at least as a function of the first and second rotor angles and the magnitude of one of the first and second currents.

7. The method of claim 6 wherein the step of determining the magnitude of one of the first and second currents includes determining the magnitude of the one of the first and second currents from one of the first and second voltages and knowledge of the resistance of one of the stator and the rotor.

8. The method of claim 6 wherein the step of determining at least one of the first and second current includes providing a current sensor and measuring the at least one of the first and second currents.

9. The method of claim 1 including the steps of determining first and second currents corresponding to the first and second voltages, respectively, and wherein the step of determining the error angle includes determining the error angle such the following formula is satisfied:

$$\Delta\xi = \xi_2^* + \arcsin\{I_1[I_1^2 + I_2^2 - 2I_1I_2 \cos(\xi_2^* - \xi_1^*)]^{-1/2} \sin(\xi_2^* - \xi_1^*)\}$$

where:
    $\Delta\xi$=the error angle
    $\xi_2^*$=the second rotor angle
    $\xi_1^*$=the first rotor angle
    $I_1$=the first current, which corresponds to the first voltage
    $I_2$=the second current, which corresponds to the second voltage.

10. A method of operating an apparatus including a field-commutated motor comprising the steps of:
    initializing the motor, the step of initializing including the steps of:
    applying a first voltage of a first orientation and of a first magnitude to one of the rotor and the stator;
    determining a first rotor angle corresponding to application of the first voltage;
    applying a second voltage to one of the rotor and the stator, the second voltage having an orientation substantially equal to the first orientation and of second magnitude different from the first magnitude, the second voltage being applied when the motor is under a load substantially equal to the load applied during the application of the first voltage;

determining a second rotor angle corresponding to the application of the second voltage;

determining an error angle, as a function of at least the first and second rotor angles, for allowing initialization of the motor;

determining a third rotor angle;

determining an initialized rotor angle from the third rotor angle and the error angle; and using the initialized angle in providing power to the motor for rotating the motor for operating the apparatus.

11. Apparatus for initializing a field-commutated motor having a rotor and a stator, comprising:

a motor power supply for providing power to at least one of the rotor and stator of the motor;

a sensor for determining rotor angle;

a processor in electrical communication with said sensor and said power supply, said processor including;

means for applying a first voltage of a first orientation and of a first magnitude to one of the rotor and the stator;

means, responsive to said sensor, for determining a first rotor angle corresponding to application of the first voltage;

means for applying a second voltage to one of the rotor and the stator, the second voltage having an orientation substantially equal to the first orientation and of second magnitude different from the first magnitude;

means for determining a second rotor angle corresponding to the application of the second voltage; and means for determining an error angle for allowing initialization of the motor, said means determining the error angle of a function of at least the following: the first and second rotor angles; one of the first voltage and the current corresponding thereto; and one of the second voltage and the current corresponding thereto.

12. Field-commutated motor apparatus, comprising:

a field-commutated motor having a rotor and a stator;

a motor power supply for providing power to at least one of the rotor and stator of the motor;

a sensor for determining rotor angles;

a processor in electrical communication with said sensor and said power supply, said processor including;

means for applying a first voltage of a first orientation and of a first magnitude to one of the rotor and the stator;

means, responsive to said sensor, for determining a first rotor angle corresponding to application of the first voltage;

means for applying a second voltage to one of the rotor and the stator, the second voltage having an orientation substantially equal to the first orientation and of second magnitude different from the first magnitude;

means for determining a second rotor angle corresponding to the application of the second voltage;

means for determining an error angle for allowing initialization of the motor, said means determining the error angle of a function of at least the following: the first and second rotor angles; one of the first voltage and the current corresponding thereto; and one of the second voltage and the current corresponding thereto; and means for determining an initialized rotor angle from a third rotor angle and the error angle, such that said power supply can provide power to said at least one of the stator and the rotor for initiating the rotor.

* * * * *